(12) United States Patent
Yamamoto et al.

(10) Patent No.: US 6,230,107 B1
(45) Date of Patent: May 8, 2001

(54) VEHICLE SPEED DETECTION SYSTEM

(75) Inventors: Shigeru Yamamoto; Hidekazu Nagase, both of Hirakata; Yasuo Kitahara, Kawasaki, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/137,848

(22) PCT Filed: Mar. 24, 1997

(86) PCT No.: PCT/JP97/01015

§ 371 Date: Aug. 21, 1998

§ 102(e) Date: Aug. 21, 1998

(87) PCT Pub. No.: WO97/37241

PCT Pub. Date: Oct. 9, 1997

(30) Foreign Application Priority Data

Mar. 29, 1996 (JP) .................................................. 8-077860
Mar. 29, 1996 (JP) .................................................. 8-077861

(51) Int. Cl.⁷ .................................................... G01P 21/00
(52) U.S. Cl. ............................ 702/96; 702/143; 342/104
(58) Field of Search ............................ 702/96, 142, 143, 702/145, 148, 127, 33, 41, 44, 85; 342/106, 114, 104, 70

(56) References Cited

U.S. PATENT DOCUMENTS

| | | | |
|---|---|---|---|
| 4,184,156 | * | 1/1980 | Petrovsky et al. ....................... 343/8 |
| 4,316,173 | * | 2/1982 | Matsumura et al. .................... 340/32 |
| 4,414,548 | * | 11/1983 | Carpenter et al. ......................... 343/8 |
| 4,506,353 | * | 3/1985 | Rott et al. ............................... 367/91 |
| 4,635,059 | * | 1/1987 | Ball ...................................... 342/117 |
| 4,980,633 | * | 12/1990 | Roskini ................................. 342/115 |
| 5,371,718 | * | 12/1994 | Ikeda et al. ............................. 367/91 |
| 5,560,431 | * | 10/1996 | Stratton .................................... 172/2 |
| 5,784,024 | * | 7/1998 | Heide et al. ........................... 342/104 |

FOREIGN PATENT DOCUMENTS

| | | |
|---|---|---|
| 53-17376 | 2/1978 | (JP) . |
| 61-201176 | 9/1986 | (JP) . |
| 2-280077 | 11/1990 | (JP) . |
| 5-52934 | 3/1993 | (JP) . |

\* cited by examiner

*Primary Examiner*—Marc S. Hoff
*Assistant Examiner*—Demetrius Pretlow
(74) *Attorney, Agent, or Firm*—Armstrong, Westerman, Hattori, McLeland & Naughton, LLP

(57) ABSTRACT

Correction for compensating for errors caused by the pitching movement of a vehicle is executed with high accuracy at low cost. The ground speed of the vehicle sensed by a Doppler sensor is corrected with angular velocities with respect to the center of gravity of the vehicle. In this correction, the center of rotation of the vehicle and the rotation of the Doppler sensor itself during the pitching movement of the vehicle are taken into account. In order to mount the Doppler sensor at a high level in the vehicle without increasing the output power of the sensor, arrangement is made such that the relationship between the difference between the actual installation level of the Doppler sensor and a reference installation level and the amount of correction of beam depression angle is stored in a look-up table; the beam depression angle corresponding to the actual installation level of the Doppler sensor is calculated through correction with the corresponding correction amount of the table; and the sensed ground speed of the vehicle is corrected with the calculated beam depression angle.

15 Claims, 11 Drawing Sheets

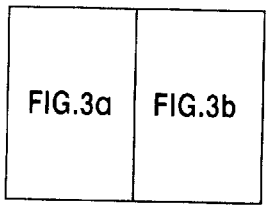
FIG.3
FIG.3a
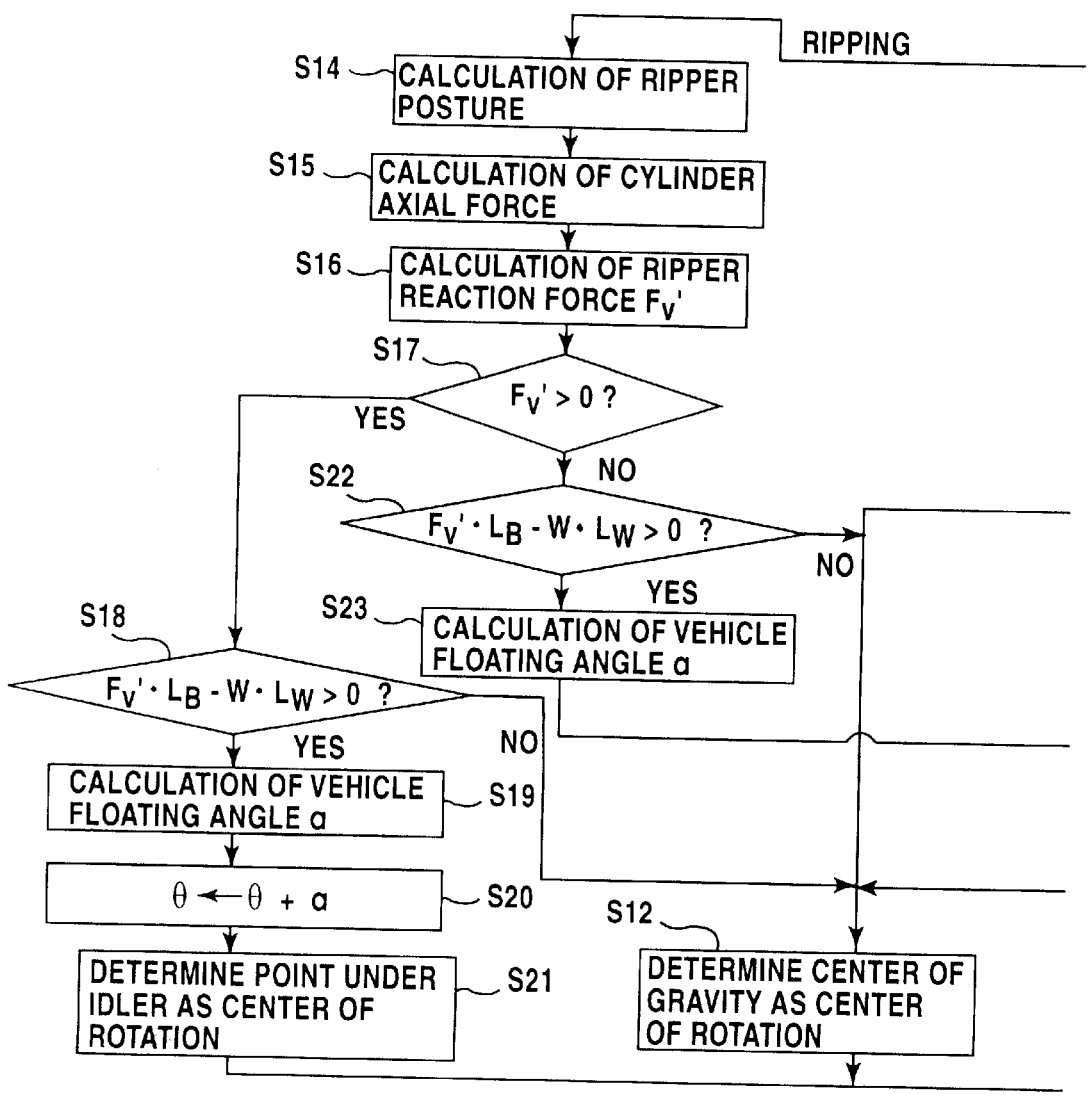

VEHICLE SPEED DETECTION SYSTEM

TECHNICAL FIELD

The present invention relates to a vehicle speed detection system and more particularly to a vehicle speed detection system installed in a construction machine such as bulldozers to detect ground speed by use of a Doppler sensor.

BACKGROUND ART

A typical vehicle speed detection system for detecting the ground speed of a vehicle uses a Doppler sensor. This detection system is designed to emit electromagnetic waves (radio waves or ultrasonic waves) from the vehicle onto the ground at a specified beam depression angle θ and to receive the electromagnetic waves which have been reflected off the ground. Based on these radiant and received waves, Doppler shift (beat wave frequency) $f_d$ is calculated, using the following equation.

$$f_d = 2f_t \cdot v \cos \theta / C \quad (1)$$

In this equation, $f_t$ is transmission frequency, C is electromagnetic wave propagation velocity (light velocity or sonic velocity) and v is actual vehicle speed.

This prior art vehicle speed detection system, however, suffers from the problem that when the actual speed of a vehicle is sensed by the Doppler sensor mounted on the vehicle body, the movements (pitching, vertical movement, yawing) of the vehicle body affect the Doppler sensor causing errors in speed detection so that the vehicle speed detection system cannot detect accurate ground speed.

Attempts to solve this problem are proposed in Japanese Patent Laid-Open Publication No. 53-17376 (1978) and No. 61-201176 (1986) which are directed to eliminating the effect of pitching angular velocity which most significantly affects speed detection. According to Japanese Patent Laid-Open Publication No. 53-17376, a plurality of Doppler sensors are mounted on a mobile unit and the speed of the mobile unit is determined by averaging, through mutual compensation, a plurality of Doppler signals sensed by the plurality of Doppler sensors. The detection system disclosed in Japanese Patent Laid-Open Publication No. 61-201176 is designed to calculate an error in speed detection from the angular velocity of the Doppler sensor with respect to the center of gravity of the vehicle and to correct a sensed ground speed based on the calculated error value.

Generally, the installation level of such a Doppler sensor, that is, the level at which such a Doppler sensor is installed when mounted on a vehicle body, is determined according to the specification of the sensor that is determined by the output power of the sensor.

Japanese Patent Laid-Open Publication No. 53-17376 directed to compensating for errors in speed detection due to the pitching of a vehicle requires a plurality of Doppler sensors, which leads to an increase in the manufacturing cost of the entire system. Japanese Patent Laid-Open Publication No. 61-201176 has the disadvantage that when the detection system is applied to a tracklaying vehicle such as bulldozers, the center of rotation of the vehicle varies according to the kind of operation being performed and to the terrain of the ground where the vehicle is traveling, which adversely affects the accuracy of correction.

Regarding the installation level of the Doppler sensor, if the Doppler sensor is mounted at a level in a vehicle such as a construction machine in accordance with the specification of the sensor, there is a strong likelihood that mud etc. may stick to the sensor causing a decrease in the signal strength of the sensor or the sensor may get damaged, hitting against rocks or stones.

It is conceivable that these problems may be solved by installation of a higher power sensor at a high position in a vehicle. However, use of a higher power sensor not only leads to higher cost but also causes disturbance to other working vehicles being operated in the same yard because of strong electromagnetic waves radiated from the high power sensor. Additionally, the output of the sensor higher than the specified value does not meet the requirement stipulated by the regulation.

The present invention is directed to overcoming the above problems and a first object of the invention is therefore to provide a vehicle speed detection system capable of correcting errors due to pitching of a vehicle body at low cost. A second object of the invention is to provide a vehicle speed detection system incorporating a Doppler sensor which can be installed at high levels in a vehicle without increasing the output power of the sensor.

DISCLOSURE OF THE INVENTION

The first object of the invention can be achieved by a ground speed detection system incorporating a Doppler sensor according to a first aspect of the invention, the detection system comprising:

(a) angular velocity detecting means for detecting the angular velocity of a vehicle with respect to the center of gravity of the vehicle while the vehicle is in pitching movement;

(b) center of rotation detecting means for detecting the center of rotation of the vehicle while the vehicle is in pitching movement; and (c) vehicle speed correcting means for correcting the ground speed of the vehicle sensed by the Doppler sensor based on the center of rotation detected by the center of rotation detecting means in addition to the angular velocity detected by the angular velocity detecting means.

In the detection system according to the first aspect of the invention, the ground speed of the vehicle sensed by the Doppler sensor is corrected by the vehicle speed correcting means based on the angular velocity with respect to the center of gravity of the vehicle detected by the angular velocity detecting means. In this correction, a value of the center of rotation of the vehicle during pitching movement detected by the center of rotation detecting means is taken into account so that the correction is in conformity with the current center of rotation of the vehicle. In this way, the accuracy of the correction can be improved and accurate ground speed unaffected by the pitching movement of the vehicle can be calculated. The achievement of accurate ground speed enables it to obtain, for example, a quantitative value of the slippage rate of the crawler belts provided in a tracklaying vehicle and the accurate rate of shoe slippage (crawler belt slippage), in turn, allows improved control of the implement, engine and other parts.

The first object can be also achieved by a ground speed detection system incorporating a Doppler sensor according to a second aspect of the invention, the detection system comprising:

(a) angular velocity detecting means for detecting the angular velocity of a vehicle with respect to the center of gravity of the vehicle while the vehicle is in pitching movement and for detecting the angular velocity of the Doppler sensor being rotated; and (b) vehicle speed correcting means for correcting the ground speed of the vehicle sensed by the Doppler sensor based on the angular velocity of the vehicle and the angular velocity of the Doppler sensor which have been detected by the angular velocity detecting means.

In the detection system according to the second aspect of the invention, the ground speed of the vehicle sensed by the Doppler sensor is corrected by the vehicle speed correcting means based on the angular velocity of the vehicle with respect to the center of gravity of the vehicle detected by the angular velocity detecting means. Since the Doppler sensor itself rotates following the pitching movement of the vehicle, the rotation of the Doppler sensor is taken into account in this correction. This improves the accuracy of the correction so that accurate ground speed which is unaffected by the pitching movement of the vehicle can be obtained.

The first object can be also achieved by a ground speed detection system incorporating a Doppler sensor according to a third aspect of the invention, the detection system comprising:

(a) angular velocity detecting means for detecting the angular velocity of a vehicle with respect to the center of gravity of the vehicle while the vehicle is in pitching movement and for detecting the angular velocity of the Doppler sensor being rotated;

(b) center of rotation detecting means for detecting the center of rotation of the vehicle while the vehicle is in pitching movement; and (c) vehicle speed correcting means for correcting the ground speed of the vehicle sensed by the Doppler sensor based on the center of rotation detected by the center of rotation detecting means in addition to the angular velocity of the vehicle and the angular velocity of the Doppler sensor which have been detected by the angular velocity detecting means.

In the detection system according to the third aspect of the invention, the ground speed sensed by the Doppler sensor is corrected by the vehicle speed correcting means based on the angular velocity of the vehicle with respect to the center of gravity of the vehicle detected by the angular velocity detecting means. In this correction, a value of the center of rotation of the vehicle during pitching movement detected by the center of rotation detecting means and the rotation of the Doppler sensor itself are taken into account. By virtue of the synergistic effect of a combination of the first and second aspects, a vehicle speed detection system having more improved correction accuracy can be achieved.

In the detection systems according to the first and third aspects, the vehicle may be a tracklaying vehicle and the center of rotation detecting means may be designed to determine ground contact points located under the respective centers of the crawler belt sprockets to be the center of rotation of the tracklaying vehicle if the tractive force of the vehicle exceeds a predetermined value and to determine a ground contact point located under the center of gravity of the vehicle to be the center of rotation of the vehicle if the tractive force does not exceed the predetermined value. Specifically, in these systems, when a load more than a predetermined value is imposed on the blade during dozing operation for example, it is determined that the tractive force of the vehicle exceeds a predetermined value. It is found from this determination that the tracklaying vehicle is currently in a condition where the center of each crawler belt idler is floating above the ground and the vehicle is in movement with ground contact points under the respective centers of the crawler belt sprockets serving as the center of rotation. In order to achieve improved correction, this center of rotation should be taken into consideration in calculating a correction value. Since the center of rotation of the vehicle varies, causing changes in the beam depression angle of the Doppler sensor, it is preferable that the vehicle speed correcting means correct the sensed ground speed based on a value obtained by adding a pitch angle of the vehicle to the beam depression angle of the Doppler sensor when the ground contact points located under the respective centers of the crawler belt sprockets are determined to be the center of rotation of the vehicle.

In a modified form of the determination of the center of rotation of a vehicle, the vehicle may be a tracklaying vehicle and the center of rotation detecting means may be designed to determine ground contact points located under the respective centers of the crawler belt sprockets to be the center of rotation of the vehicle if the moment of the reaction force imposed on the blade which is supported on the ground contact points located under the respective centers of the crawler belt sprockets exceeds the moment of the weight of the vehicle, and to determine a ground contact point located under the center of gravity of the vehicle to be the center of rotation of the vehicle if the moment of the reaction force on the blade does not exceed the moment of the weight of the vehicle. Specifically, if the moment of the reaction force imposed on the blade which is supported on the ground contact points located under the centers of the crawler belt sprockets exceeds the moment of the weight of the vehicle, it is understood that the respective centers of the crawler belt idlers are floating above the ground and the vehicle is in movement with the ground contact points under the respective centers of the crawler belt sprockets serving as the center of rotation of the vehicle. Therefore, the accuracy of the correction can be improved by calculating a correction value in consideration of this center of rotation. Since the center of rotation of the vehicle varies, causing changes in the beam depression angle of the Doppler sensor, it is preferable that the vehicle speed correcting means correct the sensed ground speed based on a value obtained by adding a pitch angle of the vehicle to the beam depression angle of the Doppler sensor when the ground contact points located under the respective centers of the crawler belt sprockets are determined to be the center of rotation. The reaction force imposed on the blade may be calculated based on the posture of the blade obtained from the stroke of the blade lift cylinders and based on the axial force of the blade lift cylinders calculated from the hydraulic pressure supplied to them.

Another modified form of the determination of the center of rotation of a vehicle is such that the vehicle may be a tracklaying vehicle and the center of rotation detecting means may be designed to determine ground contact points located under the respective centers of the crawler belt idlers to be the center of rotation of the vehicle if the reaction force imposed on the ripper supported on ground contact points located under the respective centers of the crawler belt sprockets are an upward force and the moment of this reaction force exceeds the moment of the weight of the vehicle, and to determine a ground contact point located under the center of gravity of the vehicle to be the center of rotation of the vehicle if the moment of the reaction force on the ripper does not exceed the moment of the weight of the vehicle. Alternatively, the determination may be modified such that the vehicle may be a tracklaying vehicle and the center of rotation detecting means may be designed to determine ground contact points located under the respective centers of the crawler belt sprockets to be the center of rotation of the vehicle if the reaction force imposed on the ripper supported on the ground contact points located under the respective centers of the crawler belt sprockets is a downward force and the moment of this reaction force exceeds the moment of the weight of the vehicle, and to determine a ground contact point located under the center of gravity of the vehicle to be the center of rotation of the vehicle if the moment of the reaction force on the ripper does not exceed the moment of the weight of the vehicle. Since the center of rotation of the vehicle varies, causing changes in the beam depression angle of the Doppler sensor, it is preferable that the vehicle speed correcting means correct the sensed ground speed based on a value obtained by adding a pitch angle of the vehicle to the beam depression angle of the Doppler sensor when the ground contact points located under the respective centers of the crawler belt idlers or the ground contact points located under the respective centers of the crawler belt sprockets are determined as the center of rotation. The reaction force imposed on the ripper may be calculated based on the posture of the ripper obtained from the stroke of the ripper lift/tilt cylinders and based on the axial force of the ripper lift/tilt cylinders calculated from the hydraulic pressure supplied to them.

The second object of the invention is achieved by a vehicle speed detection system incorporating a Doppler sensor according to a forth aspect of the invention, the detection system comprising:

(a) memory means for storing a look-up table containing values of the difference between the actual installation level of the Doppler sensor and a reference installation level, each difference value corresponding to each correction amount for the beam depression angle of the Doppler sensor;

(b) beam depression angle calculating means for calculating the beam depression angle corresponding to the actual installation level of the Doppler sensor mounted on a vehicle, through correction with the corresponding correction amount stored in the memory means; and (c) correcting means for correcting the ground speed of the vehicle sensed by the Doppler sensor based on the beam depression angle which has been calculated by the beam depression angle calculating means.

In the detection system according to the forth aspect, a correction amount for the beam depression angle of the Doppler sensor is obtained from a look-up table prestored in the memory means. The beam depression angle is modified using this correction amount and then a value of the ground speed of the vehicle sensed by the Doppler sensor is corrected based on this modified, beam depression angle. With this arrangement, accurate ground speed calculation is enabled even if the Doppler sensor is installed at a level that is too high to receive satisfactorily strong reflected waves from the ground. This arrangement eliminates the risks that the signal strength of the Doppler sensor drops because of sticking of mud etc. and that the Doppler sensor hits against rocks and gets damaged. Additionally, such a system does not need to employ a high power sensor, so that the manufacturing cost does not increase and moreover, it can meet the requirement stipulated by the regulation. The improvement of detection accuracy leads to accurate calculation of a quantitative value of the slippage rate of the crawler belts equipped in the tracklaying vehicle. The accurate calculation of the shoe slippage (crawler slippage) rate in turn allows an improvement in the control of the implement, engine and others incorporated in the vehicle.

The above look-up table is designed such that as the actual installation level of the sensor increases from a reference installation level, the amount of correction for beam depression angle gradually increases. Use of such a look-up table leads to high-accuracy calculation of ground speed.

According the forth aspect, the vehicle may be a bulldozer and the Doppler sensor is preferably mounted on a ripper frame for supporting the ripper of the bulldozer. This allows the Doppler sensor to be mounted at the possible lowest position that is least subjected to the influence of the operation of the bulldozer.

BEST MODE FOR CARRYING OUT THE INVENTION

Referring now to the accompanying drawings, preferred embodiments of the vehicle speed detection system of the invention will be described.

(First Embodiment)

Figure 1:
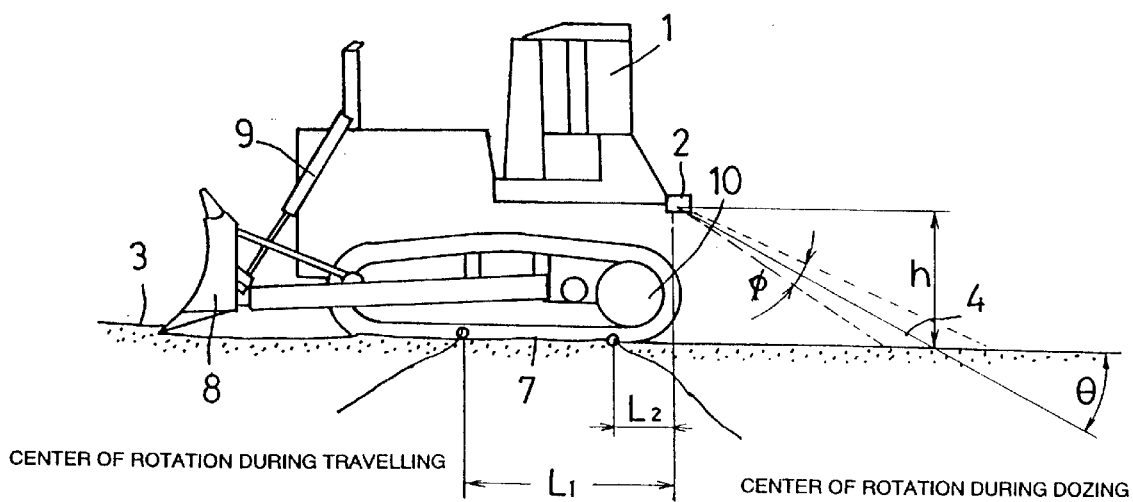
FIG. 1 shows an installation arrangement for a vehicle speed detection system according to a first embodiment of the invention.

In the first embodiment, the invention is applied to a vehicle speed detection system incorporated in a tracklaying vehicle such as bulldozers. As shown in FIG. 1, this vehicle speed detection system comprises a Doppler sensor 2 mounted on a rear part (e.g., ripper frame) of the vehicle body of a bulldozer 1 at a level (hereinafter referred to as "installation level") h. The Doppler sensor 2 directs an electromagnetic wave beam 4 onto the ground 3 at a specified beam depression angle (sensor depression angle) θ and receives the wave beam reflected off the ground 3. The ground speed of the bulldozer 1 is calculated based on these radiant and received waves. It should be noted that φ represents beam direction angle which is normally around ±5°.

Figure 2:
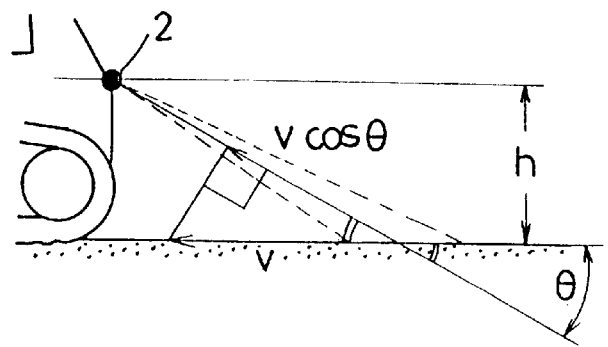
FIGS. 2(a), 2(b) and 2(c) are Explanatory Diagram 1̂ used to explain a logic for the correction executed in the vehicle speed detection system according to the first embodiment.
Figure 2:
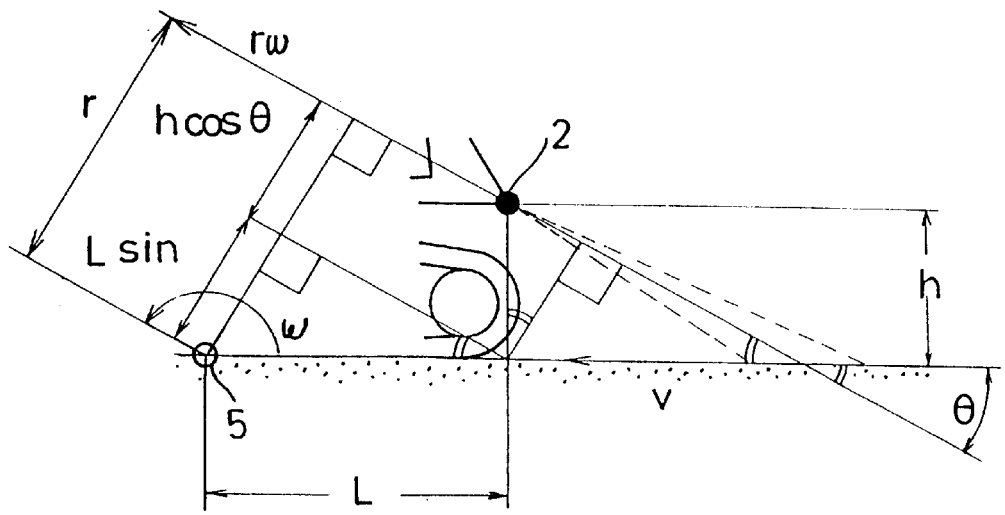
Figure 2:
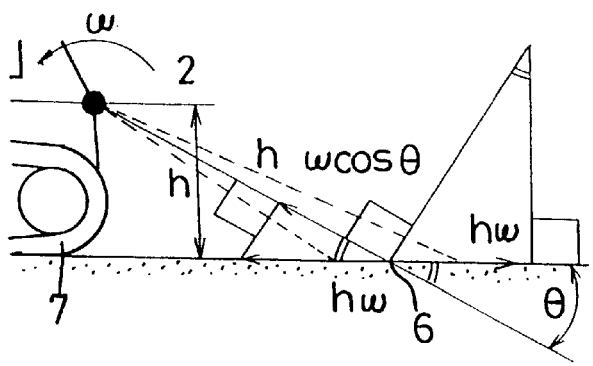

Next, reference is made to FIG. 2 to describe the logic of the correction executed in the vehicle speed detection system to eliminate the influence of the pitching angular velocity of the vehicle.

As seen from FIG. 2(a), when the actual vehicle speed of the bulldozer 1 is designated by v, the speed of the bulldozer 1 in the direction that the electromagnetic waves are radiated is described by v cos θ. Therefore, the relationship between Doppler shift (beat wave frequency) $f_d$ and the actual vehicle speed v is described by the following equation (1).

$$f_d = 2f_t \cdot v \cos \theta / C \quad (1)$$

In this equation, $f_t$ is transmission frequency, and C is electromagnetic wave propagation velocity (light velocity or sonic velocity).

In this embodiment, the Doppler sensor 2 moves in an arc curve about the center of rotation of the vehicle when the vehicle pitches. This arcing movement is accompanied by the rotation of the Doppler sensor 2. In view of this, the arcing movement and rotation of the Doppler sensor 2 are included in the equation (1) as correction terms as described below.

(1) Correction term A, associated with the arcing movement of the Doppler sensor:

As depicted in FIG. 2(b), when the vehicle rotates about the center of rotation 5, the effective radius r of the rotation of the Doppler sensor 2 about the center of rotation 5 is given by:

$$r = h \cos \theta + L \sin \theta$$

where L is the horizontal distance between the Doppler sensor 2 and the center of rotation 5.

Therefore, the correction term $A_1$ associated with the arcing movement is described by:

$$A_1 = 2f_t \cdot (h \cos \theta + L \sin \theta) \omega / C \quad (2)$$

(2) Correction term $A_2$ associated with the rotation of the Doppler sensor:

As depicted in FIG. 2(c), when the shifting speed of a reflection point 6 at which the electromagnetic wave beam 4 reflects is designated by hω, the speed component of the shifting speed in the radiating direction of the electromagnetic waves is given by hω cos θ. Therefore, the correction term $A_2$ associated with the rotation of the Doppler sensor 2 is given by the following equation (3).

$$A_2 = 2f_t \cdot h\omega \cos \theta / C \quad (3)$$

These correction terms $A_1$ and $A_2$ are incorporated into the equation (1), thereby obtaining the following equation (4).

$$f_d = 2f_t \cdot v \cos \theta / C \pm A_1 \pm A_2 = (2f_t/C)\{v \cos \theta \pm (h \cos \theta + L \sin \theta)\omega \pm h\omega \cos \theta\} \quad (4)$$

From the equation (4), the following equation (5) is given.

$$v = (f_d C / 2f_t \cos \theta) \pm 2h\omega \pm L\omega \tan \theta \quad (5)$$

In the equation (5), "−" represents the forward drive of the vehicle while "+" represents the backward drive of the vehicle. L changes according to the position of the center of rotation of the vehicle which changes for example when the vehicle is brought into a state where operation is carried out with either side of each crawler belt 7 floating above the ground. θ varies according to the floating angle of the vehicle when either side of each crawler belt is floating.

Figure 3B:
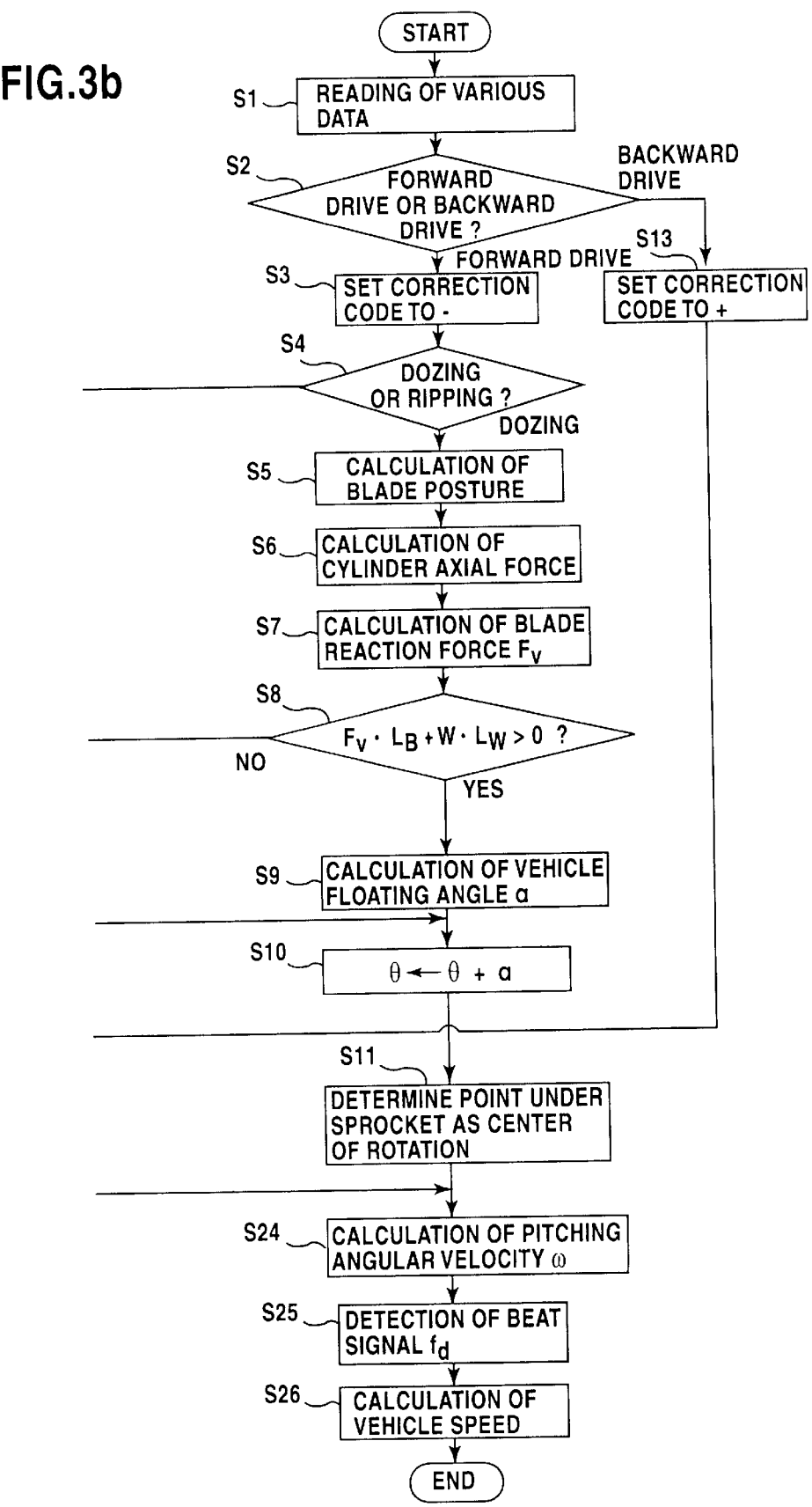
FIG. 3 is a flow chart of an arithmetic operation process for obtaining vehicle speed according to the first embodiment.
Figure 4:
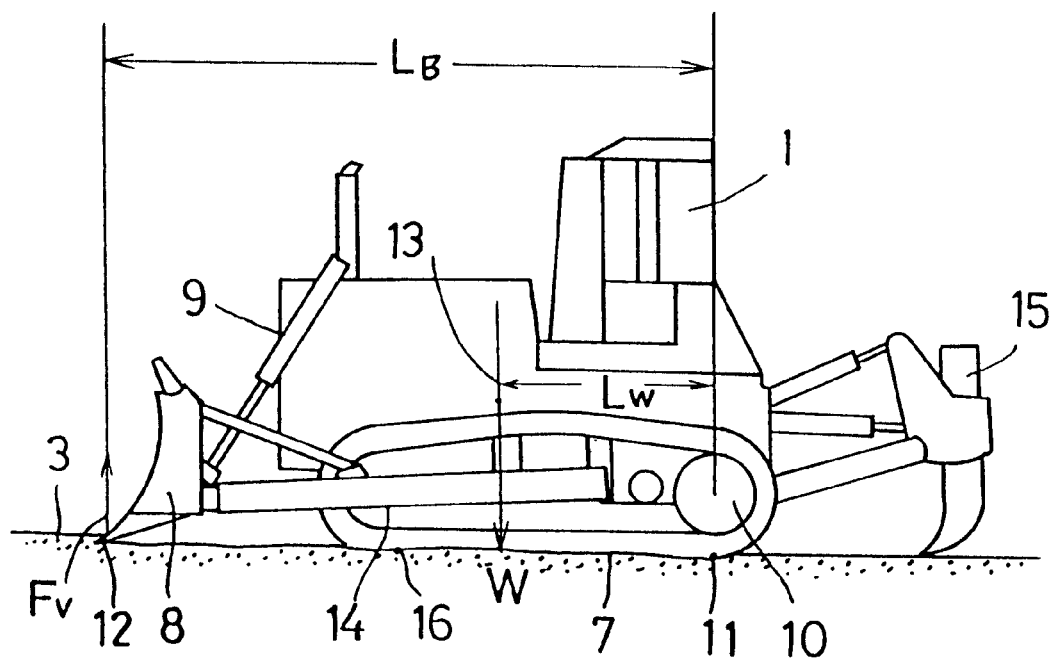
FIG. 4 is a graphic representation used to explain the balance between moments occurring in a vehicle.

Next, the flow of the vehicle speed calculation executed in the vehicle speed detection system of this embodiment will be described with reference to the flow chart of FIG. 3.

S1: various data are read.

S2 to S3: A check is made based on speed range information sent from a transmission speed range sensor to determine whether the bulldozer 1 is in a forward drive state or reverse drive state. If it is determined that the bulldozer 1 is in a forward drive state, then, the correction code of the vehicle speed calculation (the equation (5)) described later is set to − (minus).

S4 to S7: A check is made in response to an instruction sent from an implement operation detection switch to determine whether the bulldozer 1 is in a blade operating state (i.e., dozing operation state) or ripper operating state (i.e., ripping operation state). If it is determined that the bulldozer 1 is in a dozing state, the posture of the blade 8 is obtained from a blade lift cylinder stroke sensor and then, the axial force of blade lift cylinders 9 is calculated from the hydraulic pressure supplied to the blade lift cylinders 9. From the posture of the blade 8 and the cylinder axial force thus obtained, the reaction force (blade reaction force) $F_v$ which the blade 8 receives from the ground 3 is calculated.

S8 to S11: It is determined whether the following inequality (6) holds where the horizontal distance between a ground contact point 11 located under the center of each crawler belt sprocket 10 and a ground contact point 12 of the blade 8 is designated by $L_B$; the horizontal distance between the ground contact point 11 and the center of gravity 13 of the vehicle is designated by $L_W$; and the weight of the vehicle is designated by W.

$$F_v \cdot L_B + W \cdot L_W > 0 \quad (6)$$

Figure 5:
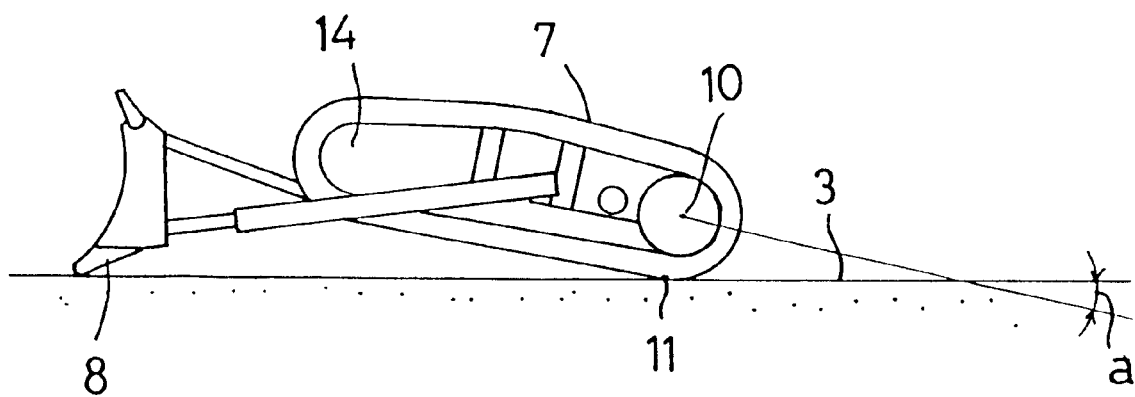
FIG. 5 is a graphic representation used to explain the condition of the vehicle during dozing operation with a ground contact point serving as the center of rotation of the vehicle.

If this inequality holds, it is then determined that the moment $F_v \cdot L_B$ of the reaction force $F_v$ imposed on the blade 8 is greater than the moment $W \cdot L_W$ of the weight W of the vehicle so that the edge of the blade 8 cannot cut into the ground 3, for instance, because of the hardness of the ground 3 and that the crawler belts on the respective sides of the idlers 4 move up, floating above the ground 3 as shown in FIG. 5 (idler floating state). If the bulldozer 1 is in this condition, the floating angle a of the vehicle is then calculated from the posture of the blade 8 and the pitch angle of the vehicle obtained from a pitching clinometer. The floating angle a thus calculated is added to a preset, beam depression angle θ for the Doppler sensor 2 to obtain an adjusted beam depression angle θ. When the vehicle floats in this way, the ground contact point 11 under the center of each crawler belt sprocket 10 is determined to be the center of rotation of the vehicle and the horizontal distance L between the Doppler sensor 2 and this center of rotation is obtained.

S12: If the inequality (6) does not hold, it is then determined that no floating occurs in the vehicle. Therefore, the center of gravity 13 of the vehicle is determined as the center of rotation and the horizontal distance L from the Doppler sensor 2 to this center of rotation is obtained.

S13: If it is determined by the check at Step S2 that the vehicle is in a reverse drive state, the correction code of the vehicle speed calculation (the equation (5)) described later is set to + (plus) and thereafter the center of gravity 13 of the vehicle is set as the center of rotation.

S14 to S16: If it is determined by the check at Step S4 that the bulldozer 1 is in a ripping operation state, the posture of a ripper 15 (see FIG. 6) is obtained from a ripper lift/tilt cylinder stroke sensor and then the axial force of ripper lift/tilt cylinders (not shown) is calculated from the hydraulic pressure supplied to the ripper lift/tilt cylinders. From the posture of the ripper 15 and the cylinder axial force thus obtained, the reaction force (ripper reaction force) $F_v'$ which the ripper 15 receives from the ground 3 is calculated.

S17 to S21: If the ripper reaction force $F_v'$ is a positive value ($F_v' > 0$), in other words, if the ripper 15 receives an upward reaction force from the ground 3, a check is then made to determine whether the following inequality (7) holds.

$$F_v' \cdot L_B - W \cdot L_W > 0 \quad (7)$$

Figure 6:
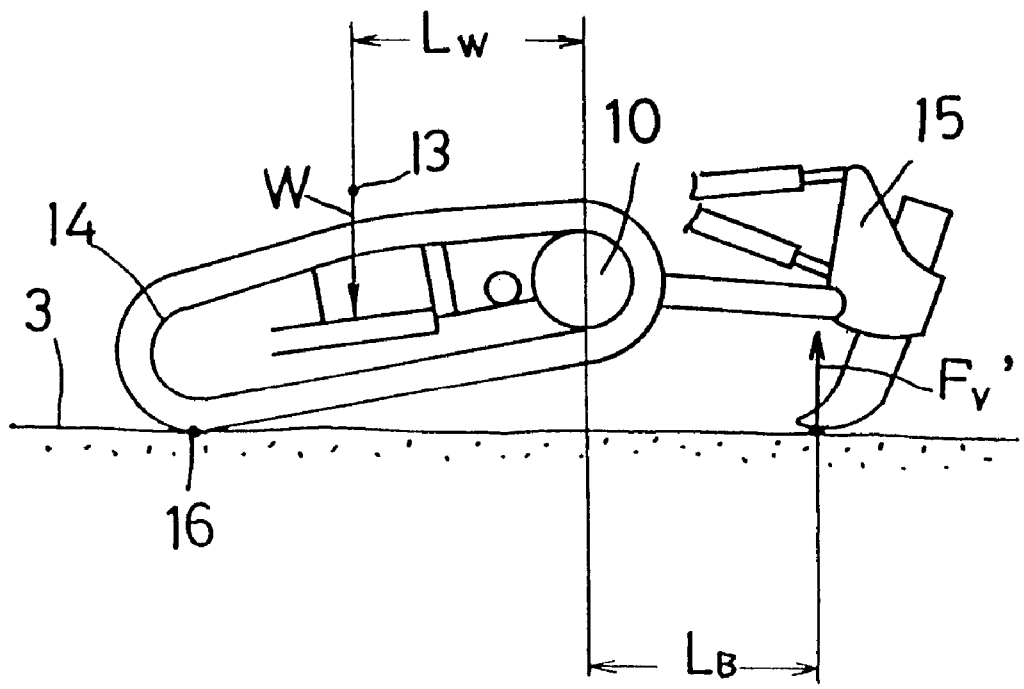
FIG. 6 is Diagram 1̂ used to explain the condition of the vehicle during ripping operation with a ground contact point serving as the center of rotation of the vehicle.

If this inequality holds, it is determined that the moment $F_v' \cdot L_B$ of the reaction force $F_v'$ imposed on the ripper 15 is greater than the moment $W \cdot L_W$ of the weight W of the vehicle so that the edge of the ripper 15 cannot cut into the ground 3, for example, because of the hardness of the ground 3 and that the crawler belts on the respective sides of the sprockets 4 move up, floating above the ground 3 as shown in FIG. 6 (sprocket floating state). If the bulldozer 1 is in this condition, the floating angle (minus value) a of the vehicle is then calculated from the posture of the ripper 15 and the pitch angle of the vehicle obtained from the pitching clinometer. The floating angle a thus calculated is added to the preset, beam depression angle θ for the Doppler sensor 2 to obtain an adjusted beam depression angle Θ. When the vehicle floats in this way, a ground contact point 16 under the center of each crawler belt idler 14 is determined to be the center of rotation of the vehicle and the horizontal distance L between the Doppler sensor 2 and this center of rotation is obtained. If the inequality (7) does not hold, it is determined that neither idler floating nor sprocket floating occurs in the vehicle. Therefore, the center of gravity 13 of the vehicle is determined as the center of rotation.

S22 to S23: If the ripper reaction force $F_v'$ is a negative value ($F_v' < 0$), in other words, if the ripper 15 receives a downward reaction force from the ground 3, a check is then made to determine whether the following inequality (7) holds.

$$F_v' \cdot L_B - W \cdot L_W > 0 \quad (7)$$

Figure 7:
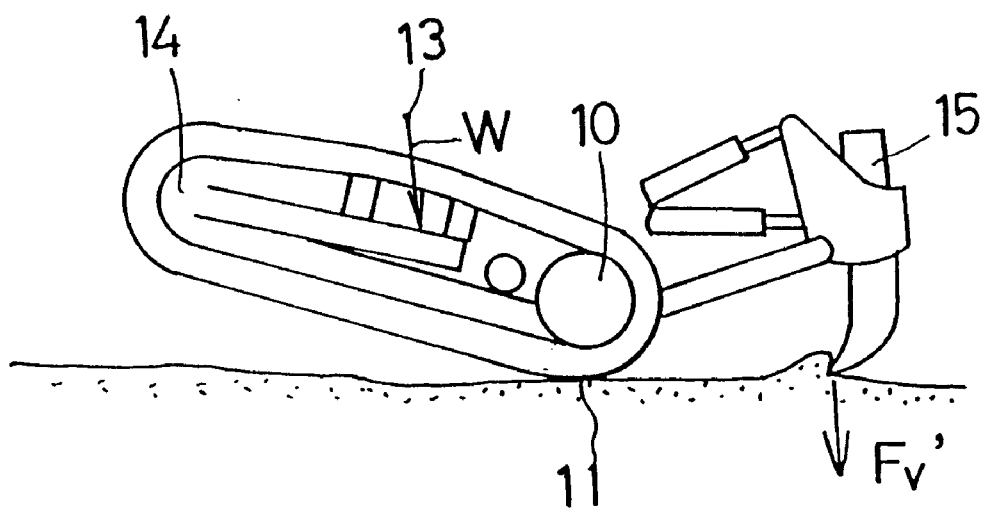
FIG. 7 is Diagram 2̂ used to explain the condition of the vehicle during ripping operation with another ground contact point serving as the center of rotation of the vehicle.

If this inequality (7) holds, it is determined that the moment $F_v' \cdot L_B$ of the reaction force $F_v'$ imposed on the ripper 15 is greater than the moment $W \cdot L_W$ of the weight W of the vehicle so that the crawler belts 7 on the respective sides of the crawler belt idlers 14 float above the ground 3 as shown in FIG. 7 (idler floating state). This state is seen for example when ripping operation is carried out so as to lift a rock upward. If the bulldozer 1 is in this condition, the floating angle a of the vehicle is then calculated from the posture of the ripper 15 and the pitch angle of the vehicle obtained from the pitching clinometer. The floating angle a thus calculated is added to the preset, beam depression angle θ for the Doppler sensor 2 to obtain an adjusted beam depression angle Θ. When the vehicle floats in this way, the ground contact point 11 under the center of each crawler belt sprocket 10 is determined to be the center of rotation of the vehicle. If the inequality (7) does not hold, it is determined that neither idler floating nor sprocket floating occurs in the vehicle. Therefore, the center of gravity 13 of the vehicle is determined as the center of rotation.

S24 to S26: The pitching angular velocity ω of the vehicle is calculated by a pitching rate gyro (angular velocity meter) and then Doppler shift (beat wave frequency) $f_d$ is detected by the Doppler sensor 2. Based on the values of ω, $f_d$, θ, L, C, $f_t$, and h, the vehicle speed v is calculated, using the equation (5).

In this embodiment, the reason why the floating angle a of the vehicle is calculated based on the posture of the blade (or the posture of the ripper) and the pitch angle of the vehicle is that a distinction is made between the case where dozing operation is carried out on a slope and the case where the bulldozer 1 simply travels on a slope.

While the reaction force working on an implement (blade or ripper) is obtained from the posture of the blade (or ripper) and cylinder axial force in the above embodiment, it may be obtained from a detected value of a load sensor for detecting a load on yoke pins for the lift cylinders. This detected value may be used alone or may be used in combination with for example cylinder axial force etc. to achieve more improved accuracy. Additionally, the posture of the blade (or ripper) may be obtained by detecting the angle of the blade lift cylinders.

(Second Embodiment)

Figure 8:
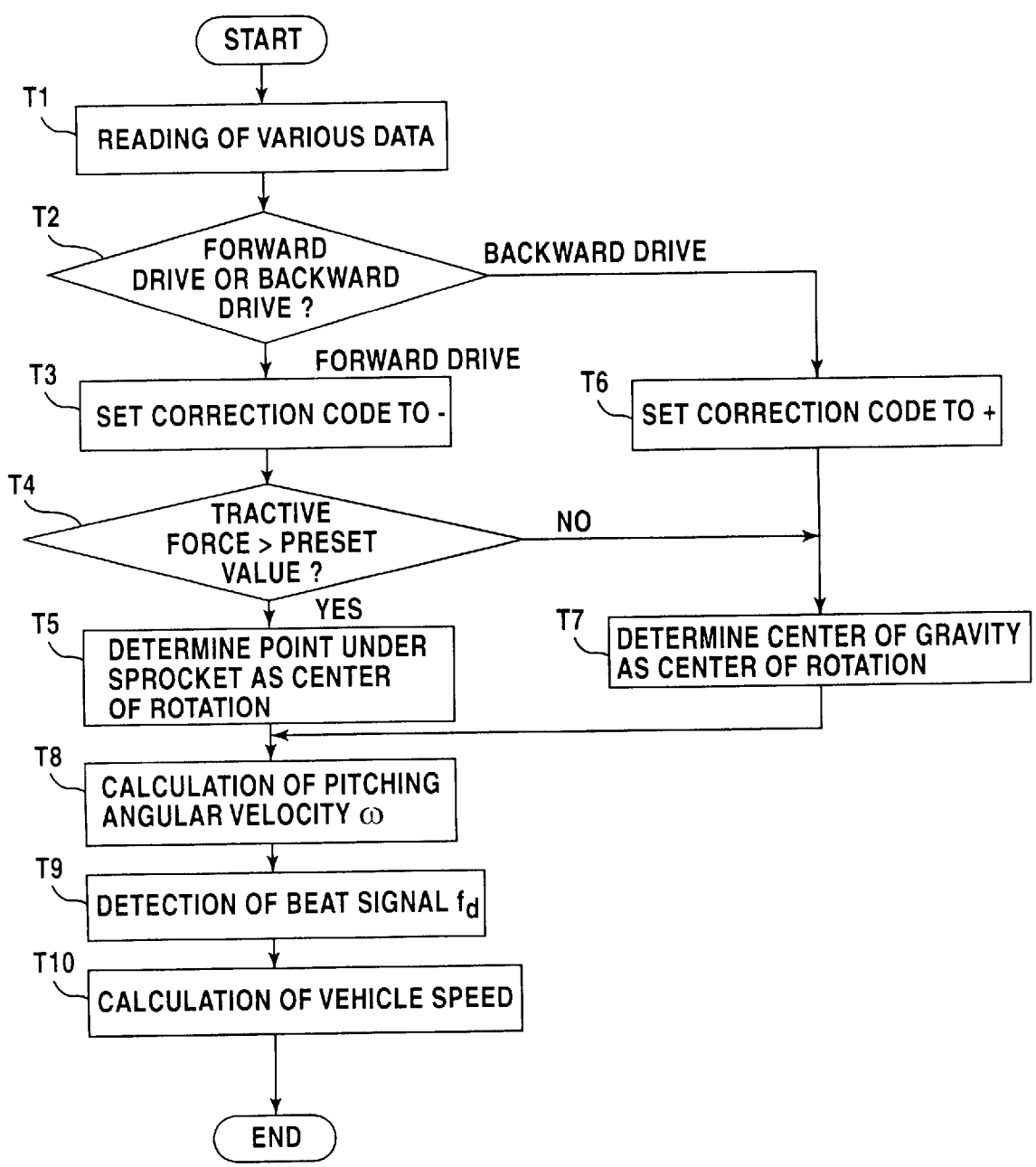
FIG. 8 is a flow chart of an arithmetic operation process for obtaining vehicle speed according to a second embodiment.

While the first embodiment is characterized in that the reaction force imposed on the blade 8 or the ripper 15 is calculated and the center of rotation of the vehicle is obtained from the moment balance of the vehicle, the second embodiment is directed to detecting a change in the center of rotation of the vehicle according to the tractive force of the bulldozer 1 during dozing operation. Reference is made to the flow chart of FIG. 8 to describe the flow of the vehicle speed calculation executed in the vehicle speed detection system of this embodiment.

T1: Various data are read.

T2 to T3: A check is made based on speed range information sent from the transmission speed range sensor to determine whether the bulldozer 1 is in a forward drive state or reverse drive state. If it is determined that the bulldozer 1 is in a forward drive state, the correction code of the vehicle speed calculation (the equation (5)) described later is set to − (minus).

T4 to T5: If a tractive force calculated by a tractive force detecting means exceeds a preset value, it is determined that the bulldozer 1 is in a dozing operation state and the center of rotation has shifted so that the respective crawler belts on the side of the idlers 14 are floating above the ground 3. Therefore, a ground contact point 11 under the center of each crawler belt sprocket 10 is determined to be the center of rotation of the vehicle and the horizontal distance L from the Doppler sensor 2 to this center of rotation is obtained. It is preferable that the tractive force detecting means disclosed herein be the same means as disclosed in Japanese Patent Laid-Open Publication no. 5-106239 (1993).

T6 to T7: If the vehicle is in a reverse drive state, the correction code of the vehicle speed calculation (the equation (5)) is set to + (plus), and then the center of gravity 13 of the vehicle is set as the center of rotation. Then, the horizontal distance L between the Doppler sensor 2 and this center of rotation is obtained. If it is found from the check at Step T4 that the tractive force does not exceed the set value, it is then judged that the vehicle is in a traveling state without floating, and therefore the center of gravity 13 of the vehicle is determined to be the center of rotation.

T8 to T10: The pitching angular velocity ω of the vehicle is calculated by the pitching rate gyro (angular velocity meter) and then Doppler shift (beat wave frequency) $f_d$ is detected by the Doppler sensor 2. Based on the values of ω, $f_d$, θ, L, C, $f_t$, and h, the vehicle speed v is calculated, using the equation (5).

Although correction by the floating angle of the vehicle is not executed in the case of idler floating in this embodiment, the beam depression angle θ may be corrected according to the floating angle a of the vehicle which has been calculated from the posture of the blade and the pitch angle of the vehicle similarly to the first embodiment.

(Embodiment 3)

This embodiment is intended to provide a detection system incorporating a Doppler sensor which can be installed at a high level in a vehicle body.

Actual vehicle speed v is given by the following equation (8) which is obtained from the equation (1) representing the relationship between Doppler shift $f_d$ and actual vehicle speed v.

$$v = f_d C / 2f_t \cos\theta \qquad (8)$$

The installation level h of the Doppler sensor 2 is limited by the specification of the sensor which is dependent on the strength of the output beam 4 and the sensitivity of reflected wave reception. If the installation height h exceeds the specified value, the beam 4 broadens so that the reflected wave corresponding to the outer region (i.e., the region represented by $\theta-\phi/2$) of the beam 4 becomes weak and therefore the Doppler sensor 2 receives the reflected wave corresponding to the inner region (i.e., the region represented by $\theta+\phi/2$) of the beam 4 more. This results in a situation equivalent to the case where the depression angle $\theta$ increases. In view of this fact, the third embodiment is designed to obtain the relationship between the installation level h and effective depression angle beforehand and correct the beam depression angle $\theta$ of the equation (8) according to the actual installation level.

Figure 9:
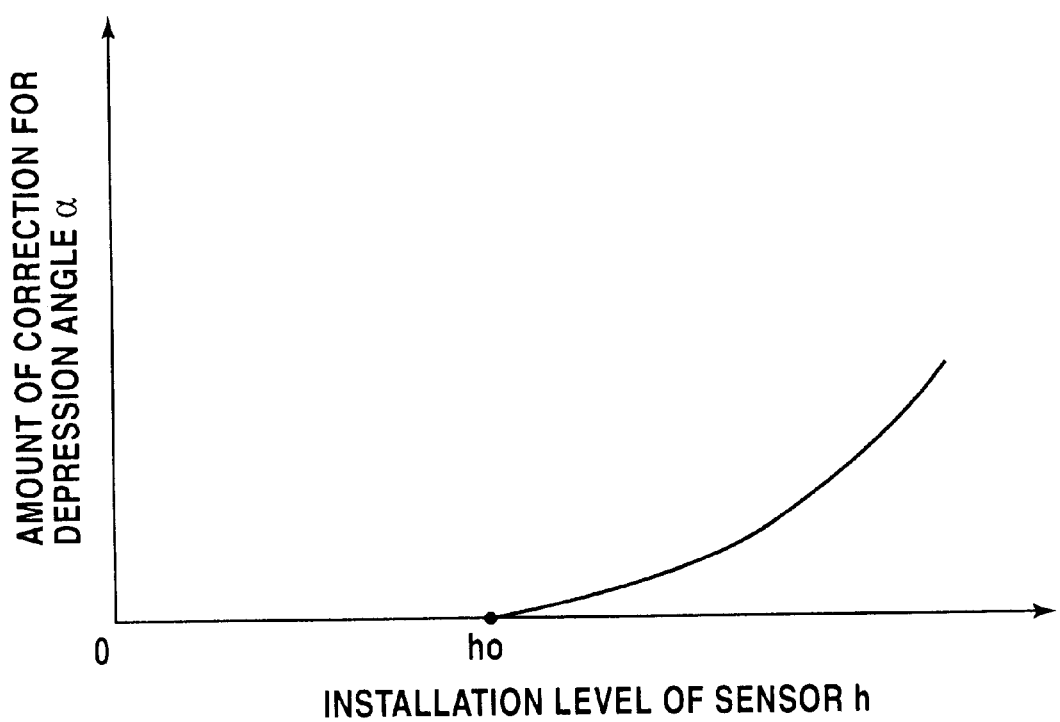
FIG. 9 is a graph showing the relationship between the installation level of a sensor and the amount of correction for beam depression angle.

More concretely, since the relationship between the installation level h and the amount of correction $\alpha$ for beam depression angle is such that as the installation level h increases from a reference value ho, the amount of correction $\alpha$ gradually increases as seen from FIG. 9, a look-up table indicating the relationship between the installation level h and the beam depression angle correction amount $\alpha$ is prestored in the memory of the vehicle speed detection system. When the Doppler sensor 2 is installed on the vehicle, this look-up table is looked up with an input value of the installation level h to obtain a corresponding value of the beam depression angle correction amount $\alpha$. This value of the correction amount $\alpha$ is added to the beam depression angle $\theta$ and the value $\theta+\alpha$ is used as an adjusted value of the beam depression angle.

The actual vehicle speed is thus calculated from the following equation.

$$v = f_d C / 2f_t \cos(\theta+\alpha) \qquad (9)$$

According to the third embodiment, a beam depression angle correction amount $\alpha$ is obtained according to the difference between the actual installation level h of the Doppler sensor 2 and the reference installation level $h_0$ and the value $\theta+\alpha$ obtained by adding the correction amount $\alpha$ to the beam depression angle $\theta$ is used as an adjusted beam depression angle to obtain an actual vehicle speed v. With this arrangement, even if the Doppler sensor 2 is installed at a position of the vehicle body which is too high for the Doppler sensor 2 to receive reflected waves of enough strength, accurate ground speed detection can be ensured.

While the relationship between the installation level h of the sensor and the amount of correction $\alpha$ for beam depression angle is stored in the form of a look-up table in this embodiment, it is also possible to store the direct, relationship between the installation level h of the sensor and beam depression angle $\theta$ as table data.

Figure 10:
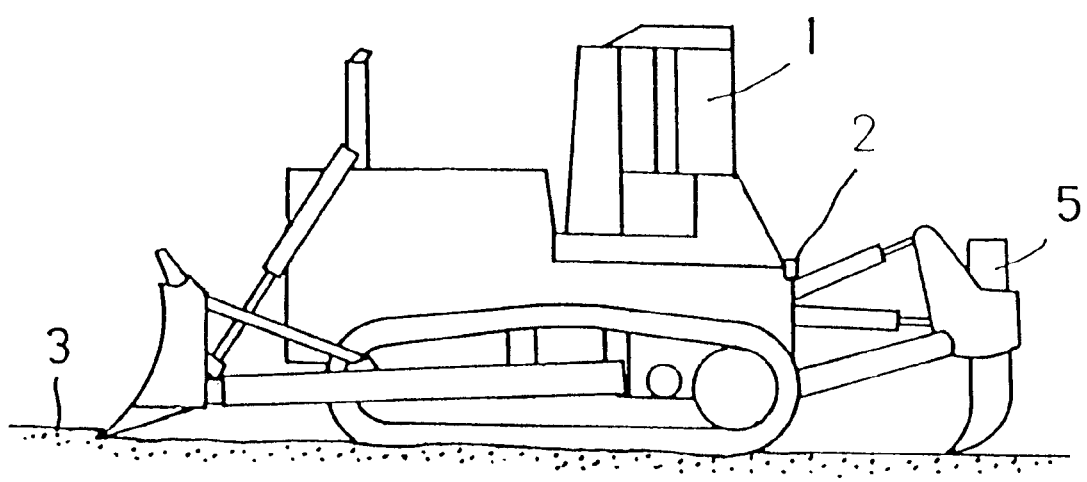
FIG. 10 is a diagram showing a position at which a Doppler sensor is to be installed.

In this embodiment, the Doppler sensor 2 is preferably mounted as shown in FIG. 10 on a ripper frame for supporting the ripper 5. This position is the possible lowest position where the Doppler sensor 2 is least affected by the operation of the bulldozer.

Although the foregoing embodiments have been described with cases where the vehicle speed detection system is incorporated in a tracklaying vehicle, the invention is also applicable to other construction machines such as wheel-type bulldozers.

Various types of Doppler sensors utilizing micro waves, ultrasonic waves or light waves may be employed as the Doppler sensor 2 disclosed in the foregoing embodiments.

What is claimed is:

1. A ground speed detection system incorporating a Doppler sensor, the detection system comprising:
   (a) angular velocity detecting means for detecting the angular velocity of a vehicle with respect to the center of gravity of the vehicle while the vehicle is in pitching movement;
   (b) center of rotation detecting means for detecting the center of rotation of the vehicle while the vehicle is in pitching movement; and
   (c) vehicle speed correcting means for correcting the ground speed of the vehicle sensed by the Doppler sensor based on the center of rotation detected by the center of rotation detecting means in addition to the angular velocity detected by the angular velocity detecting means.

2. A ground speed detection system incorporating a Doppler sensor, the detection system comprising:
   (a) angular velocity detecting means for detecting the angular velocity of a vehicle with respect to the center of gravity of the vehicle while the vehicle is in pitching movement and for detecting the angular velocity of the Doppler sensor being rotated; and
   (b) vehicle speed correcting means for correcting the ground speed of the vehicle sensed by the Doppler sensor based on the angular velocity of the vehicle and the angular velocity of the Doppler sensor which have been detected by the angular velocity detecting means.

3. A ground speed detection system incorporating a Doppler sensor, the detection system comprising:
   (a) angular velocity detecting means for detecting the angular velocity of a vehicle with respect to the center of gravity of the vehicle while the vehicle is in pitching movement and for detecting the angular velocity of the Doppler sensor being rotated;
   (b) center of rotation detecting means for detecting the center of rotation of the vehicle while the vehicle is in pitching movement; and
   (c) vehicle speed correcting means for correcting the ground speed of the vehicle sensed by the Doppler sensor based on the center of rotation detected by the center of rotation detecting means in addition to the angular velocity of the vehicle and the angular velocity of the Doppler sensor which have been detected by the angular velocity detecting means.

4. A ground speed detection system according to claim 1 or 3, wherein said vehicle is a tracklaying vehicle and said center of rotation detecting means is designed to determine ground contact points located under the respective centers of crawler belt sprockets to be the center of rotation of the tracklaying vehicle if the tractive force of the vehicle exceeds a predetermined value and to determine a ground contact point located under the center of gravity of the vehicle to be the center of rotation of the vehicle if the tractive force does not exceed the predetermined value.

5. A ground speed detection system according to claim 4, wherein said vehicle speed correcting means corrects the sensed ground speed of the vehicle based on a value obtained by adding a pitch angle of the vehicle to the beam depression angle of the Doppler sensor when the ground contact points located under the respective centers of the crawler belt sprockets are determined to be the center of rotation of the vehicle.

6. A ground speed detection system according to claim 1 or 3, wherein said vehicle is a tracklaying vehicle and said center of rotation detecting means is designed to determine ground contact points located under the respective centers of crawler belt sprockets to be the center of rotation of the vehicle if the moment of the reaction force imposed on a blade which is supported on the ground contact points located under the respective centers of the crawler belt sprockets exceeds the moment of the weight of the vehicle, and to determine a ground contact point located under the center of gravity of the vehicle to be the center of rotation of the vehicle if the moment of the reaction force on the blade does not exceed the moment of the weight of the vehicle.

7. A ground speed detection system according to claim 6, wherein the vehicle speed correcting means corrects the sensed ground speed of the vehicle based on a value obtained by adding a pitch angle of the vehicle to the beam depression angle of the Doppler sensor when the ground contact points located under the respective centers of the crawler belt sprockets are determined to be the center of rotation of the vehicle.

8. A ground speed detection system according to claim 6, wherein said reaction force imposed on the blade is calculated based on the posture of the blade calculated from the stroke of blade lift cylinders and on the axial force of the blade lift cylinders calculated from hydraulic pressure supplied to the blade lift cylinders.

9. A ground speed detection system according to claim 1 or 3, wherein said vehicle is a tracklaying vehicle and said center of rotation detecting means is designed to determine ground contact points located under the respective centers of crawler belt idlers to be the center of rotation of the vehicle if the reaction force imposed on a ripper supported on ground contact points located under the respective centers of crawler belt sprockets are an upward force and the moment of the reaction force exceeds the moment of the weight of the vehicle, and to determine a ground contact point located under the center of gravity of the vehicle to be the center of rotation of the vehicle if the moment of the reaction force on the ripper does not exceed the moment of the weight of the vehicle.

10. A ground speed detection system according to claim 9, wherein said vehicle is a tracklaying vehicle and said center of rotation detecting means is designed to determine the ground contact points located under the respective centers of the crawler belt sprockets to be the center of rotation of the vehicle if the reaction force imposed on the ripper supported on the ground contact points located under the respective centers of the crawler belt sprockets is a downward force and the moment of the reaction force exceeds the moment of the weight of the vehicle, and to determine the ground contact point located under the center of gravity of the vehicle to be the center of rotation of the vehicle if the moment of the reaction force on the ripper does not exceed the moment of the weight of the vehicle.

11. A ground speed detection system according to claim 9, wherein the vehicle speed correcting means corrects the sensed ground speed of the vehicle based on a value obtained by adding a pitch angle of the vehicle to the beam depression angle of the Doppler sensor when the ground contact points located under the respective centers of the crawler belt idlers or the ground contact points located under the respective centers of the crawler belt sprockets are determined to be the center of rotation of the vehicle.

12. A ground speed detection system according to claim 9, wherein said reaction force imposed on the ripper is calculated based on the posture of the ripper calculated from the stroke of ripper lift/tilt cylinders and on the axial force of the ripper lift/tilt cylinders calculated from hydraulic pressure supplied to the ripper lift/tilt cylinders.

13. A ground speed detection system incorporating a Doppler sensor, the detection system comprising:
  (a) memory means for storing a look-up table containing values of the difference between the actual installation level of the Doppler sensor and a reference installation level, each difference value corresponding to each correction amount for the beam depression angle of the Doppler sensor;
  (b) beam depression angle calculating means for calculating the beam depression angle corresponding to the actual installation level of the Doppler sensor mounted on a vehicle, through correction with the corresponding correction amount stored in the memory means; and
  (c) correcting means for correcting the ground speed of the vehicle sensed by the Doppler sensor based on the beam depression angle which has been calculated by the beam depression angle calculating means.

14. A ground speed detection system according to claim 13, wherein said look-up table is designed such that as the actual installation level of the Doppler sensor increases from the reference installation level, the amount of correction for the beam depression angle gradually increases.

15. A ground speed detection system according to claim 13 or 14, wherein the vehicle is a bulldozer and the Doppler sensor is mounted on a ripper frame for supporting a ripper of the bulldozer.

* * * * *